C. B. BERST.
ELECTRICAL MEASURING INSTRUMENT.
APPLICATION FILED JULY 3, 1916.
1,335,152.  Patented Mar. 30, 1920.
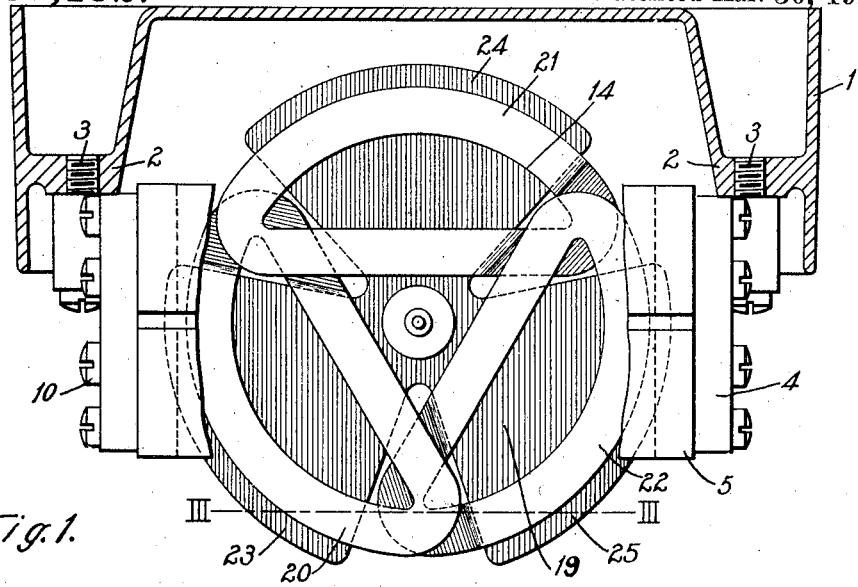
Fig. 1.
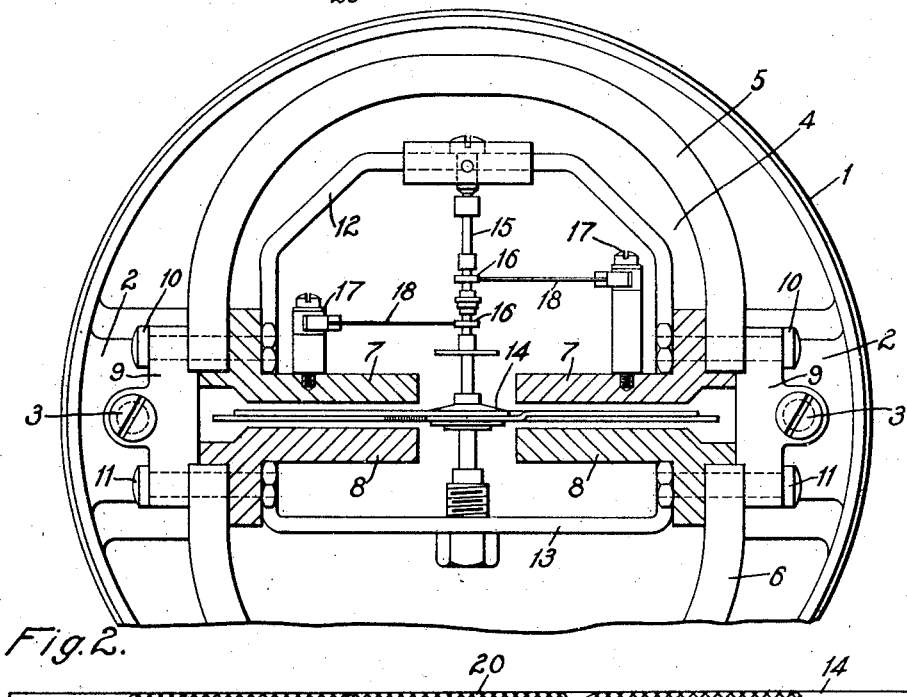
Fig. 2.
Fig. 3.
WITNESSES:
R. J. Fitzgerald
J. H. Procter
INVENTOR
Charles B. Berst.
BY
Wesley G. Carr
ATTORNEY

UNITED STATES PATENT OFFICE.

CHARLES B. BERST, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,335,152.  Specification of Letters Patent.  Patented Mar. 30, 1920.

Application filed July 3, 1916. Serial No. 107,266.

*To all whom it may concern:*

Be it known that I, CHARLES B. BERST, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to ampere-hour meters.

One object of my invention is to provide an ampere-hour meter that shall be cheap to construct and efficient and reliable in its operation.

Another object of my invention is to provide a substantially flat armature for a meter of the above indicated character that shall have a minimum thickness in order that the air gap of the instrument may be relatively small.

In the carrying out of my invention, I provide a plurality of oppositely disposed permanent magnets, detachable pole-pieces therefor and an armature comprising a conducting disk having portions cut away and a plurality of overlapping pancake coils the overlapping portions of which are so disposed with respect to the cut away portions of the disk that the thickness of the armature is substantially equal to the thickness of two of the coils. Means is also provided for so supporting the armature and the brushes from the pole-pieces that the whole meter may be easily detached from its casing.

In the accompanying drawings Figure 1 is view, partially in plan and partially in section, of a meter embodying my invention, Fig. 2 is a front view, partially in section and partially in elevation, of the meter shown in Fig. 1, and Fig. 3 is a view taken along the line III—III of Fig. 1.

A casing 1 is provided with internal lugs 2 to which are secured, by screws 3, the stationary and movable members of an ampere-hour meter 4.

The meter 4 comprises a plurality of permanent magnets 5 and 6 oppositely disposed with respect to each other and having detachable pole-pieces 7 and 8, respectively, thereon. The pole-pieces 7 are secured to the permanent magnets 5 and to a non-magnetizable member 9 by screws 10, and the pole-pieces 8 are similarly secured to the permanent magnets 6 and the members 9 by screws 11. A yoke member 12 is secured, at its ends, to the respective pole-pieces 7, and a similar yoke member 13 is secured to the pole-pieces 8. An armature 14 is mounted on a shaft 15 upon which commutator cylinders 16 are also mounted, and the shaft is supported between jewel bearings that are carried by the yoke members 12 and 13. Post members 17 are secured to the pole-pieces 7 for the purpose of supporting brushes 18 that are adapted to engage the commutator cylinders 16.

The armature 14 comprises a conducting disk 19 of substantially clover leaf shape having three sector shaped portions 23, 24 and 25 that are separated by openings and three pancake coils or windings 20, 21 and 22. The windings 20, 21 and 22 are adapted to overlap each other and to be so shaped adjacent the openings between the sectors of the disk 19 that the thickness of the armature 14 will never be greater than the thickness of two of the coils, as is clearly shown in Fig. 3 of the drawings.

The armature develops a relatively high torque because it has overlapping coils of minimum thickness and because the air gap between the pole-pieces 7 and 8 is relatively short. For a given thickness of disk, the cut-away portions permit relatively less retardation by the magnets 5 and 6. This causes the armature to rotate at a relatively high speed for a given torque, but, since the torque is high, the speed is correspondingly high and the effect of friction in the operation of the device is relatively small.

It will be understood that my invention is not limited to the specific structure illustrated, as many modifications may be made therein without departing from the spirit and scope of the invention as set forth in the appended claims.

I claim as my invention:

1. An armature for a measuring instrument comprising a disk having portions thereof cut away at equidistant points with respect to each other, and a plurality of substantially flat overlapping windings disposed on one side of the disk, the overlapping portions of one winding being within the cut-away portions of the disk whereby the thickness of the armature is only the thickness of two windings.

2. An armature for a measuring instrument comprising a disk having portions thereof cut away and a plurality of substantially flat windings disposed on one side only of the disk and so overlapping adjacent the cut-away portions of the disk that the thickness of the armature is equal to the thickness of two windings.

3. An armature for a measuring instrument comprising a disk having portions thereof cut away and a plurality of substantially flat overlapping windings disposed on one side only of the disk, the overlapping portion of one winding being within the cut-away portion of the disk to provide an armature having minimum thickness.

4. An armature comprising a disk having three cut-away portions at equidistant points with respect to each other, and three pancake coils disposed on one side of the disk, the coils being so shaped that they overlap and the overlapped portion of one coil being within the cut-away portion.

5. An armature comprising a single disk having openings therein and overlapping windings on one side only of the disk so disposed with respect to the openings that the thickness of the armature is substantially the thickness of two of the windings.

6. An armature comprising a disk having openings therein and overlapping coils on one side only thereof, said coils overlapping in such manner that one overlapping portion of each coil is disposed within an opening in the disk.

7. An armature comprising a disk of substantially clover-leaf shape and three pancake overlapping coils on one side only thereof, said coils being so shaped that one overlapping portion of each coil extends between the leaves of the disk.

In testimony whereof I have hereunto subscribed my name this 30th day of June, 1916.

CHARLES B. BERST.